US012631136B1

(12) United States Patent
Kaniel

(10) Patent No.: US 12,631,136 B1
(45) Date of Patent: May 19, 2026

(54) CAROUSEL INTERNAL COMBUSTION ENGINE

(71) Applicant: Uri Kaniel, Netanya (IL)

(72) Inventor: Uri Kaniel, Netanya (IL)

( * ) Notice: Subject to any disclaimer, the term of this patent is extended or adjusted under 35 U.S.C. 154(b) by 0 days.

(21) Appl. No.: 19/281,785

(22) Filed: Jul. 28, 2025

(51) Int. Cl.
  F02B 75/26 (2006.01)
  F02B 75/22 (2006.01)
  F16C 3/06 (2006.01)
(52) U.S. Cl.
  CPC ............ F02B 75/225 (2013.01); F02B 75/26 (2013.01); F16C 3/06 (2013.01)
(58) Field of Classification Search
  CPC .......... G02B 75/225; F16C 3/06; F02B 75/26; F02B 75/265
  See application file for complete search history.

(56) References Cited

U.S. PATENT DOCUMENTS 4,043,301 A * 8/1977 Rheingold ............ F01B 3/0008
                                             123/57.1
4,228,656 A 10/1980 MacGlashan 2001/0003948 A1 6/2001 Uski
2004/0221823 A1 11/2004 Warren
2007/0017460 A1 * 1/2007 Ferman ................... F02B 75/26
                                             123/52.1
2013/0087120 A1 * 4/2013 Konig ..................... F01B 9/042
                                             123/311

* cited by examiner

*Primary Examiner* — Jacob M Amick
(74) *Attorney, Agent, or Firm* — Shlomo Horowitz; Shlomo Horwitz Patents and Intellectual Property Ltd.

(57) ABSTRACT

A spatially compact engine block assembly for an internal combustion engine, includes a substantially cylindrical engine block including three or more cylinders, each having a central vertical axis, the central vertical axes are substantially parallel to one another, three or more crankshafts, three or more first gears, each of the first gears configured to be rotated by the shaft of one of the crankshafts (each of the crankshafts rotating a different first gear), and a central gear situated inward of, and in a beveled relationship with, each of the first gears such that the central gear rotates in a direction substantially perpendicular to a rotation of each of the first gears. Each of the cylinders may be positioned such that a collection of coplanar points comprising a point of each of the central vertical axes along a plane substantially perpendicular to the central vertical axes, is substantially a regular polygon.

22 Claims, 21 Drawing Sheets

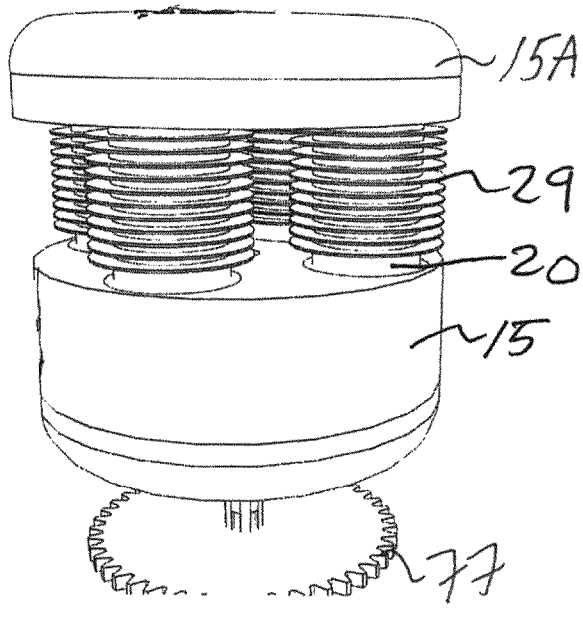
*FIG. 12B1*

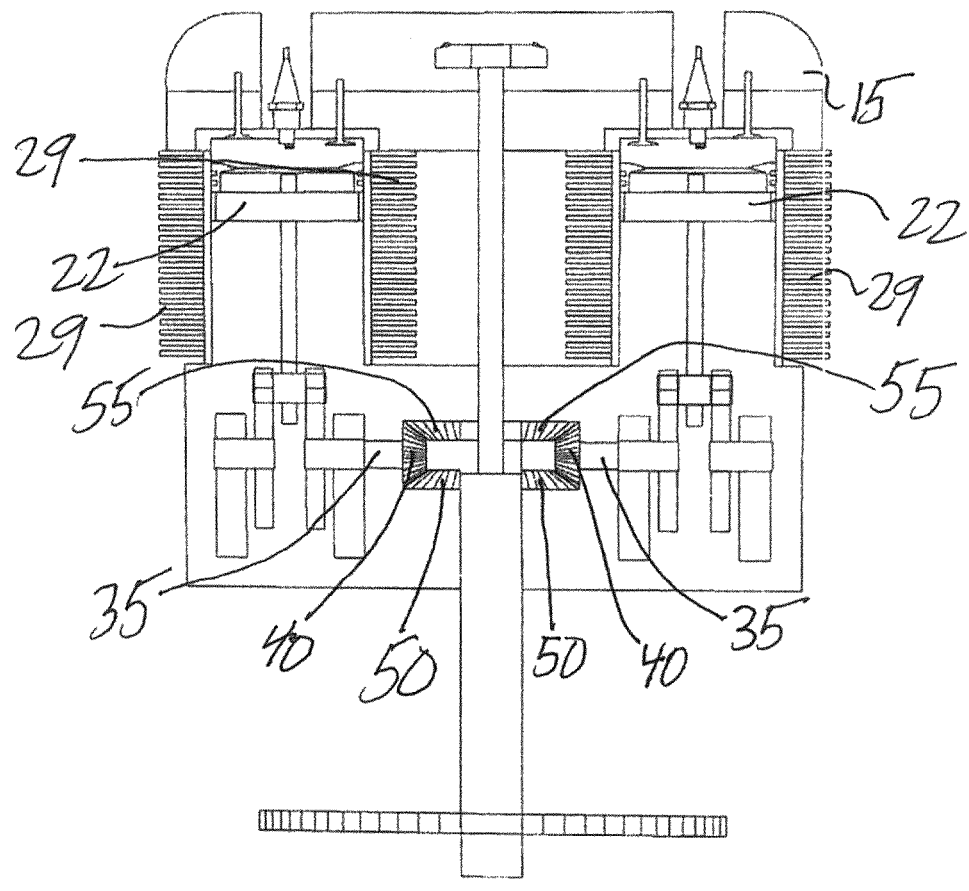
FIG. 12B2

CAROUSEL INTERNAL COMBUSTION ENGINE

FIELD OF THE INVENTION

Certain embodiments relate generally to an engine whose cylinders are arranged in a substantially circular configuration, and more specifically, to such an arrangement of three or more cylinders that incorporates bevel gears.

BACKGROUND OF THE INVENTION

Spatial considerations are of importance to an internal combustion engine. So is weight. If an internal combustion engine can be made smaller or more compact without compromising its power output, then in effect its power output per volume has increased.

SUMMARY OF THE INVENTION

One embodiment is a spatially compact engine block assembly for an internal combustion engine, comprising:
a substantially cylindrical engine block including:
three or more cylinders, each having a central vertical axis, the central vertical axes are substantially parallel to one another;
 three or more crankshafts in an amount equal to an amount of the three or more cylinders, each of the crankshafts connected to and configured to receive a linear motion generated by one of the three or more cylinders and to rotate a shaft, the three or more crankshafts connected to a bottom end of the engine block;
 three or more first gears in an amount equal to an amount of the three or more crankshafts, each of the first gears configured to be rotated by the shaft of one of the crankshafts such that each one of the crankshafts rotates a different one of the first gears; and
 a central gear situated inward of, and in a beveled relationship with, each of the first gears such that the central gear rotates in a direction substantially perpendicular to a rotation of each of the first gears.

In some embodiments, each of the three or more cylinders is positioned such that a collection of coplanar points comprising a point of each of the central vertical axes along a plane substantially perpendicular to the central vertical axes, is substantially a regular polygon.

In some embodiments, the central gear rotates substantially within a plane and wherein a length of the cylinders is substantially perpendicular to the plane.

In some embodiments, the assembly further comprises a second central gear parallel to the central gear, the second central gear situated inward of and in a beveled relationship with each of the first gears such that the second central gear rotates in a direction substantially perpendicular to the rotation of each of the first gears. In some embodiments, the second central gear is distanced from the central gear by approximately a height of the first gears.

In some embodiments, each of the three or more first gears is situated equidistant from an underside of the engine block.

In some embodiments, the three or more cylinders comprise four cylinders.

In some embodiments, the three or more cylinders comprise five cylinders.

In some embodiments, the three or more cylinders comprise six cylinders.

In some embodiments, the three or more cylinders comprise at least seven cylinders.

In some embodiments, the three or more cylinders comprise at least eight cylinders.

In some embodiments, each of the cylinders comprises a piston and wherein for each of the three or more crankshafts a line of translation of a particular piston of a particular cylinder is substantially parallel to an axle of rotation of a particular crankshaft connected to the particular cylinder.

Another embodiment is a spatially compact engine block assembly for an internal combustion engine, comprising:
a substantially cylindrical engine block including:
 a first set of three or more cylinders each having a central vertical axis, the central vertical axes substantially parallel to one another, each of the three or more cylinders has a top piston and a bottom piston that opposes the top piston;
 a first set of three or more first crankshafts in an amount equal to an amount of the three or more cylinders, each of the first crankshafts connected to and configured to receive a linear motion generated by a bottom piston of one of the three or more cylinders and to rotate a first shaft, the three or more first crankshafts connected to a top end of the engine block;
 a first set of three or more first gears in an amount equal to an amount of the three or more first crankshafts and situated in a substantially polygonal relationship to one another, each of the first gears configured to be rotated by the shaft of one of the first crankshafts such that each one of the first crankshafts rotates a different one of the first gears;
 a lower central gear situated inward of, and in a beveled relationship with, each of the first gears such that the lower central gear rotates in a direction substantially perpendicular to a rotation of each of the first gears;
 a set of three or more second crankshafts in an amount equal to the three or more cylinders, each of the second crankshafts connected to and configured to receive a linear motion generated by a top piston of one of the three or more second cylinders and to rotate a second shaft, the three or more second crankshafts connected to a top end of the engine block;
 a set of three or more second gears in an amount equal to the three or more second crankshafts, each of the second gears configured to be rotated by the shaft of one of the second crankshafts such that each one of the second crankshafts rotates a different one of the second gears; and
 an upper central gear situated inward of, and in a beveled relationship with, each of the second gears such that the upper central gear rotates in a direction substantially perpendicular to a rotation of each of the second gears.

In some embodiments, each of the three or more cylinders is positioned such that a collection of coplanar points comprising a point of each of the central vertical axes along a plane substantially perpendicular to the central vertical axes, is substantially a regular polygon.

In some embodiments, the lower central gear rotates substantially within a plane and wherein a length of each of the three or more cylinders is substantially perpendicular to the plane and wherein the upper central gear rotates substantially within a second plane and wherein the first plane is substantially perpendicular to the second plane.

In some embodiments, the assembly further comprises a second lower central gear parallel to the lower central gear, the second lower central gear situated inward of and in a beveled relationship with each of the first gears such that the second lower central gear rotates in a direction substantially perpendicular to the rotation of each of the first gears. In some embodiments, the second lower central gear is distanced from the lower central gear by approximately a height of the first gears.

In some embodiments, the assembly further comprises a second upper central gear parallel to the upper central gear, the second upper central gear situated inward of and in a beveled relationship with each of the second gears such that the second upper central gear rotates in a direction substantially perpendicular to the rotation of each of the second gears. In some embodiments, the second upper central gear is distanced from the upper central gear by approximately a height of the second gears.

In some embodiments, the three or more cylinders comprise four cylinders.

In some embodiments, the three or more cylinders comprise five cylinders.

In some embodiments, the three or more cylinders comprise six cylinders.

In some embodiments, the three or more cylinders comprise at least seven cylinders.

In some embodiments, each of the three or more cylinders comprises a piston and wherein for each of the three or more first crankshafts a line of translation of a particular piston of a particular cylinder of the three or more cylinders is substantially parallel to an axle of rotation of a particular first crankshaft connected to the particular cylinder.

A further embodiment is a spatially compact engine block assembly for an internal combustion engine, comprising:

a substantially cylindrical engine block including:

a first set of three or more first cylinders each having a first central vertical axis, the first central vertical axes substantially parallel to one another;

a set of three or more crankshafts in an amount equal to an amount of the three or more first cylinders, each of the crankshafts connected to and configured to receive a linear motion generated by one of the three or more first cylinders vis a first connecting rod and to rotate a first shaft, the three or more crankshafts connected to a top end of the first set of three or more first cylinders;

a set of three or more first gears in an amount equal to an amount of the three or more first crankshafts and situated in a substantially polygonal relationship to one another, each of the first gears configured to be rotated by the shaft of one of the crankshafts such that each one of the crankshafts rotates a different one of the first gears;

a central gear situated inward of, and in a beveled relationship with, each of the first gears such that the central gear rotates in a direction substantially perpendicular to a rotation of each of the first gears;

a second set of three or more second cylinders above the first set of three or more first cylinders, each of the three or more second cylinders having a second central vertical axis, the second central vertical axes are substantially parallel to one another, wherein the set of three or more crankshafts are also connected to a bottom end of the second set of three or more second cylinders and are configured to receive a linear motion generated by one of the three or more second cylinders vis a second connecting rod and to rotate the shaft, wherein the three or more crankshafts are connected to a bottom end of the second set of three or more second cylinders.

In some embodiments, each of the three or more first cylinders is positioned such that a collection of coplanar points comprising a point of each of the first central vertical axes along a plane substantially perpendicular to the first central vertical axes, is substantially a regular polygon.

BRIEF DESCRIPTION OF THE DRAWINGS

Various embodiments are herein described, by way of example only, with reference to the accompanying drawings, wherein:

FIG. 12B1 is a side perspective view of the engine block and assembly of FIG. 12A with air cooling tubes, in accordance with one embodiment;

FIG. 12B2 is a sectional view of a four cylinders of assembly having an air cooling system including air cooling tubes, in accordance with one embodiment;

DETAILED DESCRIPTION OF THE EMBODIMENTS

Figure 1:
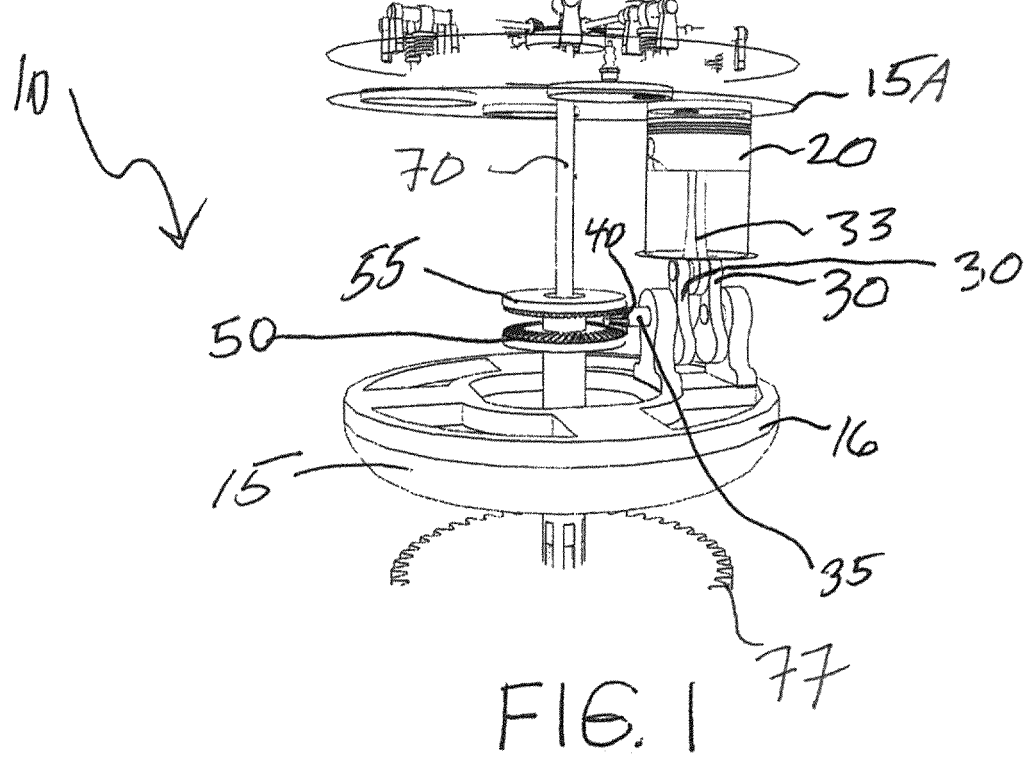
FIG. 1 is a perspective view of a spatially compact engine block assembly for an internal combustion engine showing one of its cylinders and connected crankshaft, in accordance with one embodiment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

It will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features.

Applicant has discovered a way of making internal combustion engines more efficient by reducing the space needed for the engine block (and also reducing the weight of the engine block). Applicant has astutely observed that in land vehicles (and also in marine vehicles) there is a separation of the passenger compartment and the engine related section of the vehicle. From this observation, Applicant has concluded that in land vehicles (and also in marine vehicles) there is therefore a need to minimize the length of the longest dimension of the engine compartment, namely the area of the vehicle containing the internal combustion engine.

Applicant has also discovered a way of making internal combustion engines, or at least the engine block thereof, make enjoyable to look at. The visual natural of the engine block has particular importance on a boat or other marine (or other) vehicle where the engine is visible. Typically, engines stick out of a boat in an ugly manner that does not mesh with the beauty of the marine environment. Furthermore, passengers on a boat have a keen interest in enjoyment, more than those in a land vehicle (at least compared to the typical land vehicle). The configurations described herein are enjoyable and even interesting to look at. This enhances the value of a marine vehicle. By making the engine block in a way that resembles a snapshot of a carousel, this advantage is achieved. The resemblance to a snapshot of a carousel is accomplished by the substantially circular shape of the engine block and further in those embodiments in which the cylinders are visible or partially visible the resemblance to the carousel in even more striking.

It is sometimes advantageous to increase the number of cylinders of an internal combustion engine in order to increase its power generation. For the same number of objects with the same width and spacing, (in this case the number of cylinders) the longest dimension of a linear layout of these objects is about x times larger than the diameter of the circular layout of these objects. So the circular layout is significantly more compact than a linear layout in terms of the longest dimension-roughly by a factor of the approximately 3.14 (the Greek letter Pi). Even if one compares a circular layout to a rectangular layout it is typical for the rectangular layout to involve not more than two banks of cylinders rather than a square configuration. Thus the circular layout is still significantly more compact than the rectangular layout in terms of the longest dimension.

The circular layout minimizes the size of the longest dimension compared to other layouts in which adding cylinders involves increasing the longest dimension relative to rectangular or other shapes of engines. For example, if you want to have a large number of cylinders to increase power, you can add more and more cylinders using the substantially circular layout described herein. What is referred to is not hundreds of cylinders, but rather relatively small numbers of cylinders, such as three, four, five, six, seven, eight nine, ten, eleven, twelve, thirteen, fourteen, fifteen, sixteen etc.

In addition, because of its simple structure, the internal combustion engine that utilizes the assembly of the embodiments herein, has components that are easy to work with due to its symmetric structure. This saves manpower. In some embodiments, an additional advantage is that the way the cylinders are arranged allows the engine to continue operating, unlike a standard internal combustion engine which has to be shut down when the crankshaft breaks. Even if one crankshaft were to fail or break, the other crankshafts will continue to generate motion and power from the other cylinders, unlike an engine that relies on a single crankshaft. In this scenario, the engine can continue to operate.

The assembly is compatible with both a four-stroke and two-stroke gasoline engine (or other engines) as well as a diesel engine. In addition, it is suitable for heavy and special vehicles, marine vessels, aviation (helicopter and small aircraft) and more.

The assembly, in any suitable embodiment, is also usable in other devices having internal combustion engines, besides vehicles, such as pumps and chain saws, etc.

Another advantage of the assembly described herein is that in some embodiments the structure of the assembly allows easy addition of cylinders in order to increase power and strength. With a single circular gear in the center, you just add cylinders around the periphery of the central gear.

The engine block that incorporates the assembly can be manufactured by machining.

All crankshafts are protected and are located in the oil pan, which ensures that the wear and tear is minimized.

The embodiments of the assembly herein and the engine blocks that these assemblies are part of have the advantage that they can be installed not just vertically, as shown in the drawings, but also horizontally (the cylinders are positioned horizontally) to suit the needs of compactness in any setting, including but not limited to marine settings such as boats. The engine block is suitable for installation in a horizontal or vertical shaped configurations. This is in contrast to the standard 4 cylinder engine block of the internal combustion engine in an automobile, where there is space to stand it up vertically under the hood of the front of the car, but not horizontally which would use too much space from left to right that is not available.

It is also possible to double the power of an engine that incorporates the assembly of certain embodiments of the assembly by building it as an opposed piston engine.

Unlike prior art internal combustion engines, the engine structure of the compact assembly for the internal combustion engine herein allows for more effective air or water cooling. For example, some embodiments, have a partially open cylinder block that is appropriate for air cooling, not just water cooling.

The embodiments utilize an engine block that is substantially cylindrical. At a minimum, the cylinders in the engine block are spaced substantially equidistantly from one another in a substantially regular polygon-like arrangement. When referring to an engine block, that engine block may be fully enclosed or partially enclosed.

In some embodiments, the engine block is substantially cylindrical with equilateral sides, in which case the cylinders are configured at the points of an ellipse with equal sides. However, such a configuration for the cylinders may make using beveled gear arrangements more complex, although not impossible.

The embodiments described herein relate either to a regular set of cylinders incorporating pistons, or to opposing cylinders that have within them opposing pistons. Furthermore the number of cylinders that the embodiments relate to for the regular set of pistons and cylinders (as opposed to the opposing pistons) can vary widely from three cylinders and up (for example four cylinders, five cylinders and up to twelve cylinders or even more than twelve).

In some embodiments, each of the three or more cylinders comprises a piston and for each of three or more cylinders there is a crankshaft to the cylinder. Accordingly, in some embodiments, for each of the three or more crankshafts a line of translation of a particular piston of a particular cylinder (of the three or more cylinders) is substantially parallel to an axle of rotation of a particular crankshaft connected to the particular cylinder.

The crankshafts each have a shaft for conveying rotational motion and have a gear at the end of the shaft. The gear (at the end of the shaft) may be in a beveled relationship with a central gear for the whole assembly. All of the cylinders face inwardly toward this central gear. The assembly may also include a second central gear substantially parallel to the central gear and offset therefrom. The second central gear may have a diameter that is substantially identical to the diameter of the central gear.

The assembly in certain embodiments is compatible with for a four-stroke or a two-stroke gasoline engine as well as a diesel engine.

In certain embodiments, the assembly is compatible with the internal combustion engine of a hybrid electric vehicle, such as a hybrid vehicle having a four stroke engine.

Another embodiment involves an assembly applicable to an engine block for an opposed-piston engine. There are also different versions of the assembly that is applicable to this opposed-piston engine or engine block.

In one embodiment, the engine block assembly includes a substantially cylindrical engine block including three or more cylinders, each having a central vertical axis, the central vertical axes are substantially parallel to one another, three or more crankshafts, three or more first gears, each of the first gears configured to be rotated by the shaft of one of the crankshafts (each of the crankshafts rotating a different first gear), and a central gear situated inward of, and in a beveled relationship with, each of the first gears such that the central gear rotates in a direction substantially perpendicular to a rotation of each of the first gears. Each of the cylinders may be positioned such that a collection of coplanar points comprising a point of each of the central vertical axes along a plane substantially perpendicular to the central vertical axes, is substantially a regular polygon.

The principles and operation of a "Carousel" Internal Combustion Engine may be better understood with reference to the drawings and the accompanying description.

The term "carousel" as used herein is not intended to describe an actual carousel but rather merely intends to suggest the round nature of the engine blocks described herein and the round nature of the assemblies described herein.

FIG. 1 shows part of a spatially compact engine block assembly 10 for an internal combustion engine. In particular, only of the cylinders 20 is shown even though the assembly 10 has three or more such cylinders 20.

Figure 2:
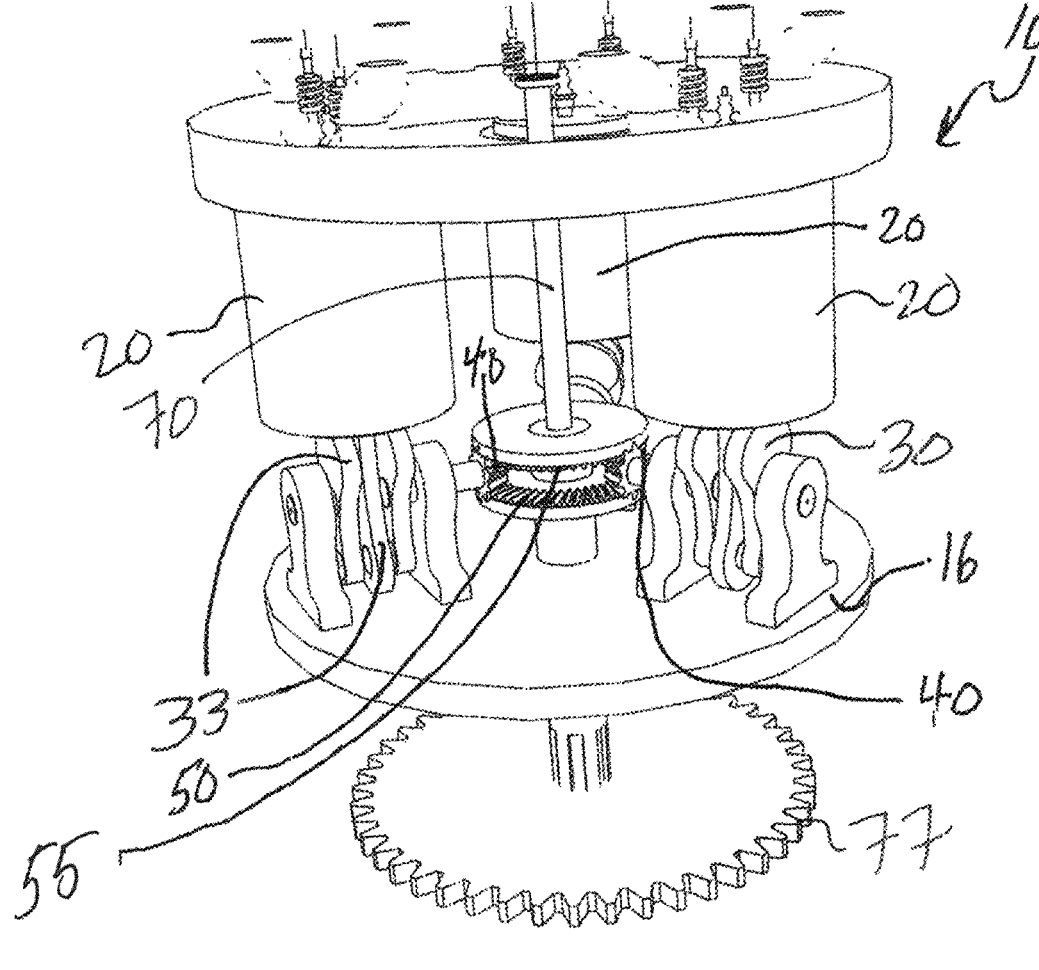
FIG. 2 is a perspective view of a spatially compact engine block assembly for an internal combustion engine including three of its cylinders and connected crankshafts, in accordance with one embodiment.
Figure 3A:
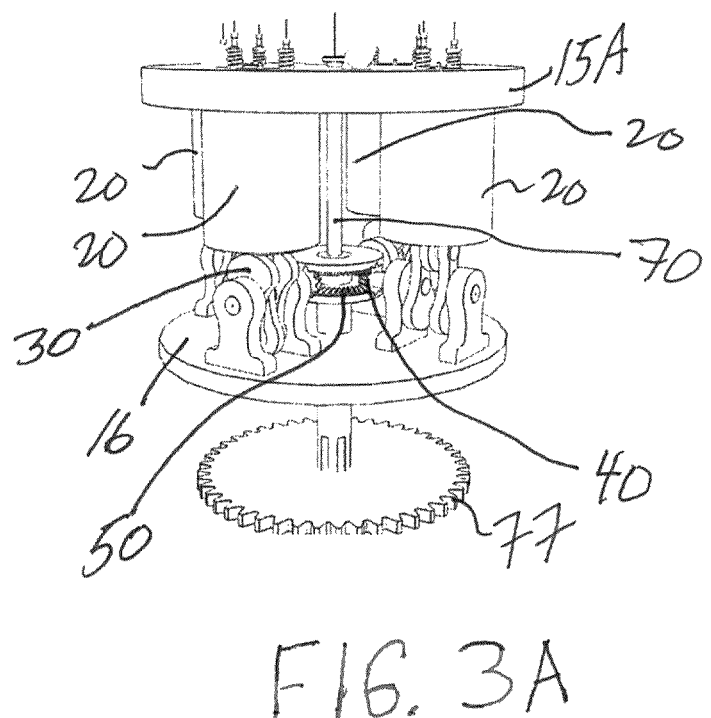
FIG. 3A is a perspective view of a spatially compact engine block assembly for an internal combustion engine including four cylinders and their connected crankshafts, in accordance with one embodiment, in accordance with one embodiment.
Figure 13A:
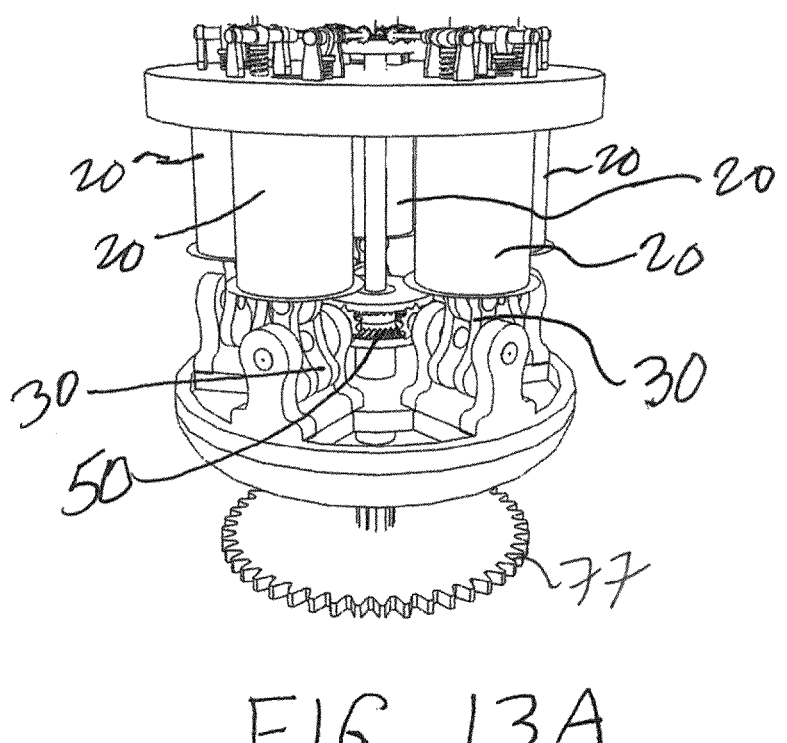
FIG. 13A is a perspective view of a spatially compact engine block assembly for an internal combustion engine including five cylinders and their connected crankshafts, in accordance with one embodiment, in accordance with one embodiment.
Figure 13B:
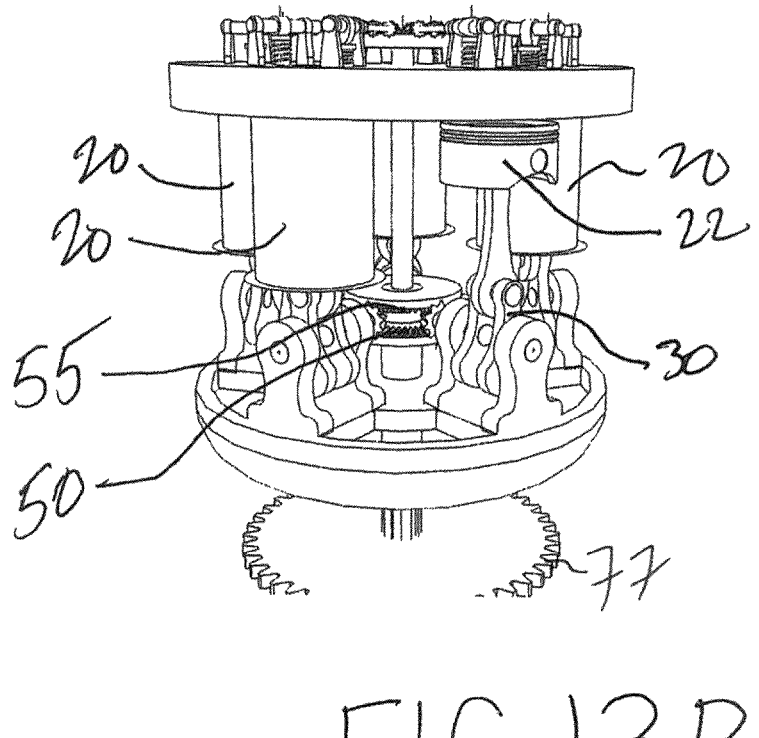
FIG. 13B is a perspective view of a spatially compact engine block assembly for an internal combustion engine having five cylinders as in FIG. 13A except revealing the piston inside one of the cylinders, in accordance with one embodiment, in accordance with one embodiment.

FIG. 1 shows part of a spatially compact engine block assembly 10 for an internal combustion engine, which may comprise a substantially cylindrical engine block 15 (only the top and bottom of the engine block 15 is visible so that the components inside the engine block 15 may be visible). Assembly 10 may comprise three or more cylinders 20, for example three, four, five, six, seven, eight, nine, ten, eleven, or twelve cylinders or more (for example sixteen or between 13 and 16), although in FIG. 1 only a single cylinder is present. FIG. 2 shows the assembly 10 with three cylinders 20. FIG. 3A shows the assembly 10 having four cylinders 20. FIG. 13A and FIG. 13B show the assembly 10 with five cylinders.

Figure 9:
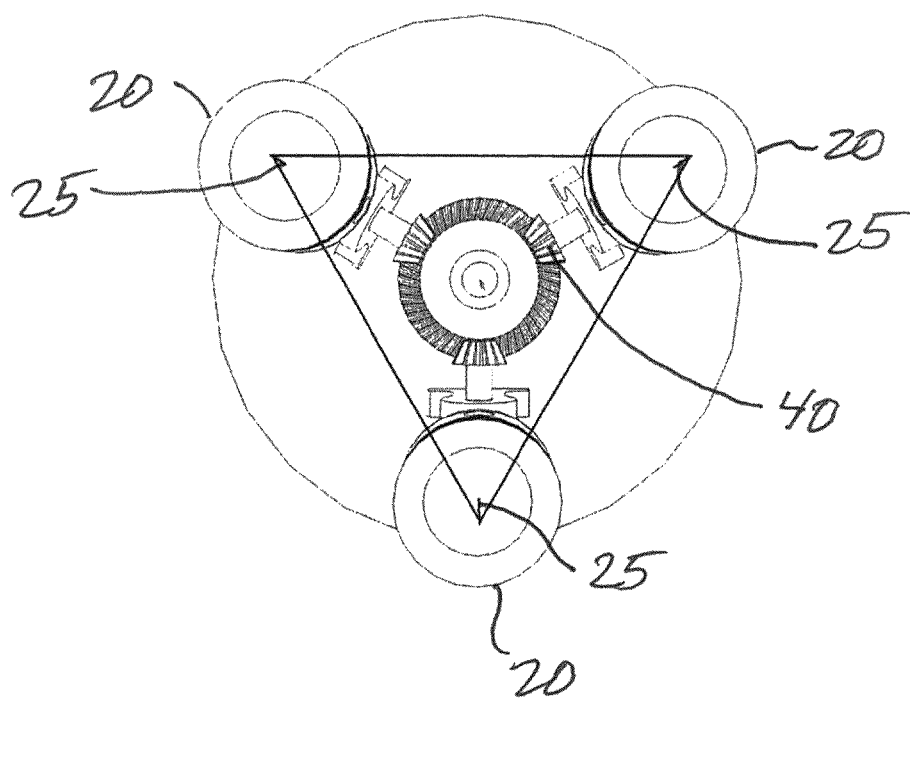
FIG. 9 is a top view of an inside of an engine block assembly showing each of three cylinder having central vertical axes that can be connected into a substantially regular polygon along a plane, in accordance with one embodiment.
Figure 10:
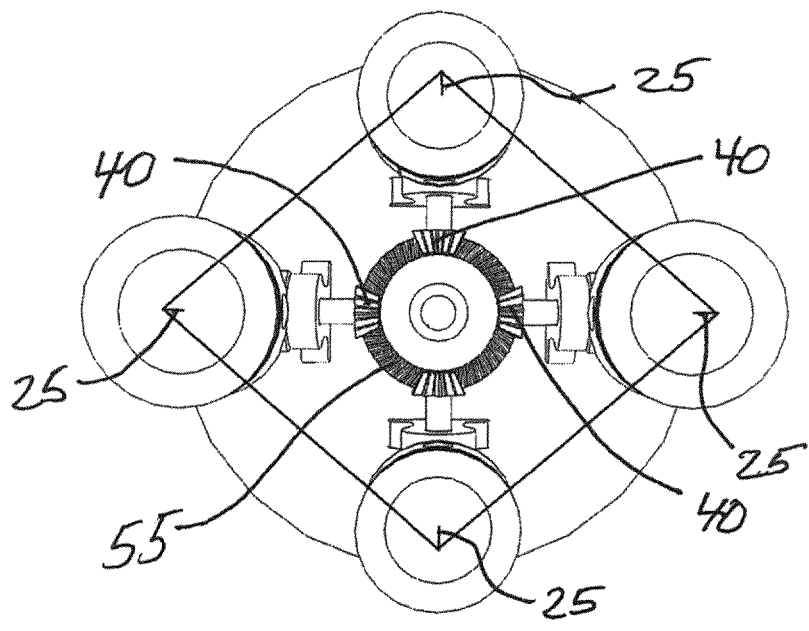
FIG. 10 is a top view of an inside of an engine block assembly showing each of four cylinder having central vertical axes that can be connected into a substantially regular polygon along a plane, in accordance with one embodiment.
Figure 11:
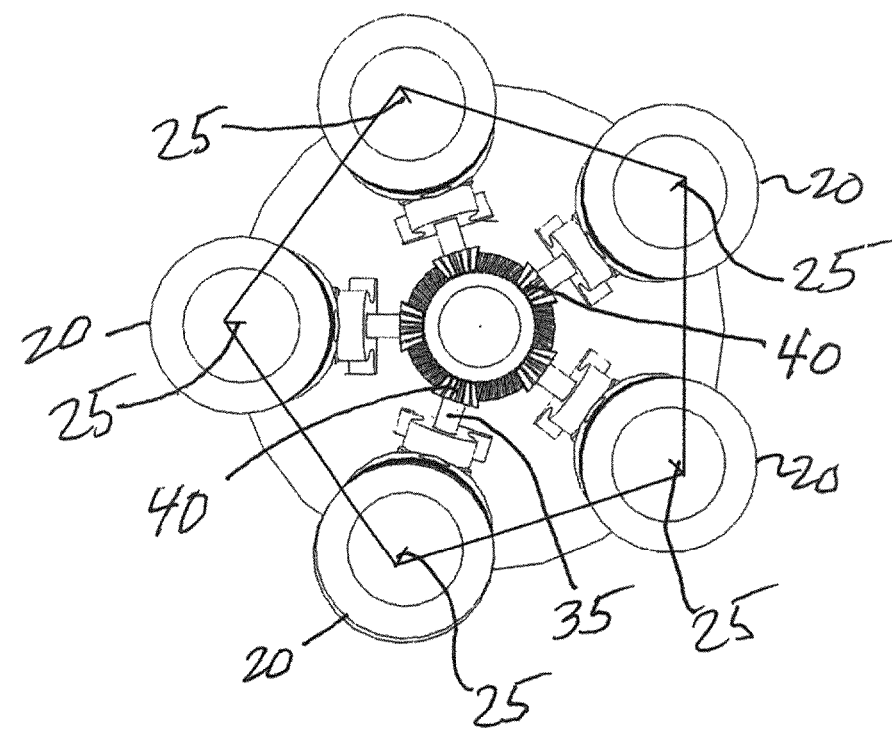
FIG. 11 is a top view of an inside of an engine block assembly showing each of five cylinders having central vertical axes that can be connected into a substantially regular polygon along a plane, in accordance with one embodiment.

As shown in FIG. 9 which depicts three cylinders 20, FIG. 10, which depicts four cylinders 20, or in FIG. 11 which depicts 5 cylinders, each of the cylinders 20 has a central vertical axis 25 and the central vertical axes 25 are substantially parallel to one another.

In some non-limiting implementations, as shown in FIG. 9, FIG. 10 and FIG. 11, each of the at least three cylinders 20 is positioned such that a collection of coplanar points comprising a point of each of the central vertical axes 25 along a plane substantially perpendicular to the central vertical axes 25, is substantially a regular polygon. Such a plane is shown in FIG. 9, FIG. 10 and FIG. 11. In some embodiments, as seen from FIGS. 9-11, the number of sides of the substantially regular polygon equals the number of cylinders 20. In some embodiments, as seen from FIGS. 9-11, the number of sides of the substantially regular polygon equals the number of central vertical axes 25. Although the non-limiting implementations of FIGS. 2-3 and 9-11 depict three, four or five cylinders 20 (whose central vertical axes have points that form three, four or five-sided substantially regular polygons, this is just illustrative and the same correspondences (between the number of cylinders 20 and the number of sides of the substantially regular polygons and between the number of cylinders 20 and the number of central vertical axes 25) can be generated with versions that have more than five cylinders 20, such as six, seven, eight, nine, 10, eleven, twelve, etc.

As shown in FIG. 2 and FIG. 3A, engine block assembly 10 may also comprise three or more crankshafts 30 in an amount equal to an amount of the three or more cylinders 20 (i.e. if there are three cylinders 20 there are three crankshafts 30, if there are four cylinders 20 there are four crankshafts 30, if there are five cylinders 20 there are five crankshafts 30, if there are six cylinders 20 there are six crankshafts 30, if there are seven cylinders 20 there are seven crankshafts 30, if there are eight cylinders 20 then there are eight crankshafts 30, etc.). Each of the three or more crankshafts 30 are connected (by connecting rod 33) to one of the three or more cylinders 20 each of the three or more crankshafts are configured to receive a linear motion generated by, one of the three or more cylinders 20 and to rotate a shaft 35 (of a particular crankshaft 30). As shown in FIG. 2 and FIG. 3A, the three or more crankshafts 30 are connected to a bottom end 16 of the engine block 15.

As shown in FIG. 1, FIG. 2 and FIG. 3A, assembly 10 may also comprises three or more first gears 40 in an amount equal to an amount of the three or more crankshafts 30, each of the first gears 40 configured to be rotated by the shaft of one of the crankshafts 30 such that each one of the crankshafts 30 rotates a different one of the first gears 40.

As can be seen from FIG. 2, in some embodiments, each of the three or more first gears is situated equidistant from an underside of the engine block 15.

As shown in FIG. 1, FIG. 2, FIG. 3A, FIG. 4, FIG. 5, FIG. 6, assembly 10 may also comprise a central gear 50 situated inward of and in a beveled relationship with, each of the first gears 40 such that the central gear 50 rotates in a direction substantially perpendicular to a rotation of each of the first gears 40. In some embodiments, at least a portion (an inwardly place portion) of all of the cylinders 20 face the central gear 50 (and if there is a second central gear 55 they face that also).

In some embodiments, the central gear 50 rotates substantially within a plane and wherein a length of each of the three or more cylinders 20 is substantially perpendicular to the plane.

As seen from FIG. 1, FIG. 2, FIG. 4, FIG. 5, FIG. 6, FIG. 7 and FIG. 8, assembly 10 may further comprise a second central gear 55 parallel to the central gear 50, the second central gear situated inward of and in a beveled relationship with each of the first gears such that the second central gear 55 rotates in a direction substantially perpendicular to the rotation of each of the first gears. Central gear 50 and second central gear 55 turn in opposite directions (if one turns clockwise the other turns counterclockwise).

In some embodiments, as seen from FIGS. 1-8, the second central gear 55 is distanced from the central gear 50 by approximately a height of the first gears, or in some embodiments, by a rotational distance along the first gears of approximately 180 degrees from where each of the teeth of the first gears 40 engaged to the central gear 50.

The second central gear 55 (or the central gear 50 is there is no second central gear 55) is connected to a central shaft 70 (FIG. 1, FIG. 2, FIG. 3A, FIG. 3C) that connects to the engine head 15A, which is the portion of the engine block 15. At the top end of the central shaft 70, shaft 70 is connected to the engine head 15A, and specifically transmits rotational motion through a bevel gear arrangement to the valves to make them open and close.

Although the drawings FIG. 1, FIG. 2, FIG. 3A, FIG. 3C, FIG. 12C, FIG. 13A, FIG. 13B and FIG. 14 show flywheel 77 centrally on the bottom, this is not a requirement. For example, in another option for any version described herein, a small flywheel may be connected to (for example below each crankshaft 30) for efficient transmission of rotational motion to the driveshaft.

As explained, in some embodiments the three or more cylinders 20 comprise four (or at least four) cylinders. In some embodiments, the three or more cylinders 20 comprise five (or at least five) cylinders 20. In some other embodiments, the three or more cylinders comprise six (or at least six) cylinders 20. In some other embodiments, the three or more cylinders 20 comprise seven (or at least seven) cylinders, or in other embodiments comprise eight (or at least eight) cylinders or in some other embodiments, comprise nine (or at least nine) cylinders or in some embodiments, comprise ten (or at least ten) cylinders in some other embodiments, or in some other embodiments comprise eleven (or at least eleven) cylinders in some other embodiments, or in other embodiments comprise twelve (or at least twelve) cylinders, or more, etc.

As shown in FIG. 13B, each of the cylinders 20 comprises a piston 22 and for each of the three or more crankshafts 30 a line of translation of a particular piston 22 of a particular cylinder 20 is substantially parallel to an axle of rotation of a particular crankshaft 30 connected to the particular cylinder 20. Without being bound by theory, the axle of rotation of the particular crankshaft 30 is the line that define the central axis around which the entire crankshaft 30 turns. Without being bound by theory, the axle of rotation defines the path of rotation of the crankshaft 30 as the crankshaft generates and transmits power from the reciprocating motion of the pistons 22.

At the bottom end of the engine block are a number of components that are not flat. Although depicted schematically in the drawings (for example FIG. 1, FIG. 2 and FIG. 3A) as flat, this portion of the drawing is merely schematic and omits the portions of the crankshafts 30 that support the crankshafts 30 and that connect the crankshafts 30 to the bottom end 16 of the engine block 15.

Regarding the points of the central vertical axes 16 that for a substantially regular polygon, a substantially regular polygon includes a substantially equilateral triangle (if there are 3 cylinders 30), a substantial square (if there are 4 cylinders 30), a substantially regular pentagon (if there are 5 cylinders 30, a substantially regular hexagon, a substantially regular heptagon, a substantially regular octagon, a substantially regular nonagon, a substantially regular decagonal, a substantially regular hendecagon, a substantially regular dodecagon, etc.).

In some implementations, the number of cylinders 20 is four, four or more, five, five or more, six, six or more, seven, seven or more, eight, eight or more, nine, nine or more, ten, ten or 10 or more, eleven, eleven or more, twelve, twelve or more, etc.

In one implementation, each of the three or more cylinders 20 comprises a piston 28 and for each of three or more crankshafts 30 a line of translation of a particular piston 28 of a particular cylinder 20 of the three or more cylinders 20 is substantially parallel to an axle of rotation of a particular crankshaft 30 connected to the particular cylinder 20.

Figure 12A:
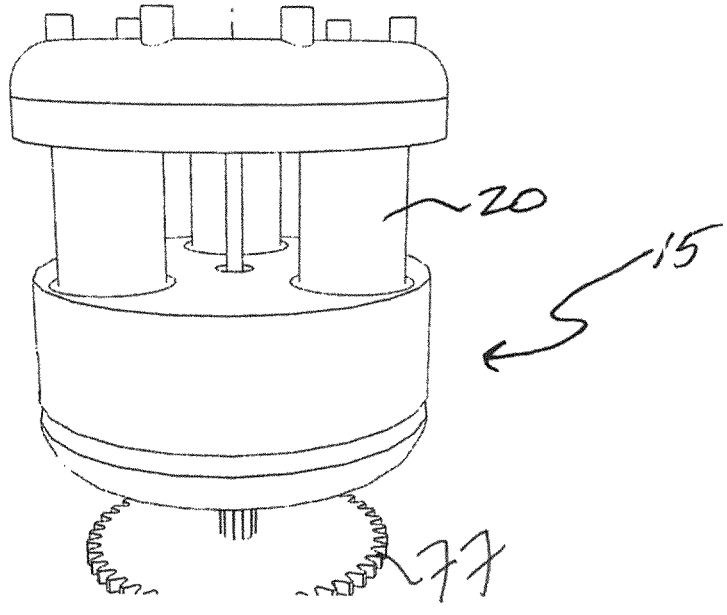
FIG. 12A is a side perspective view of a substantially cylindrical engine block having an outer casting, in accordance with one embodiment.
Figure 12C:
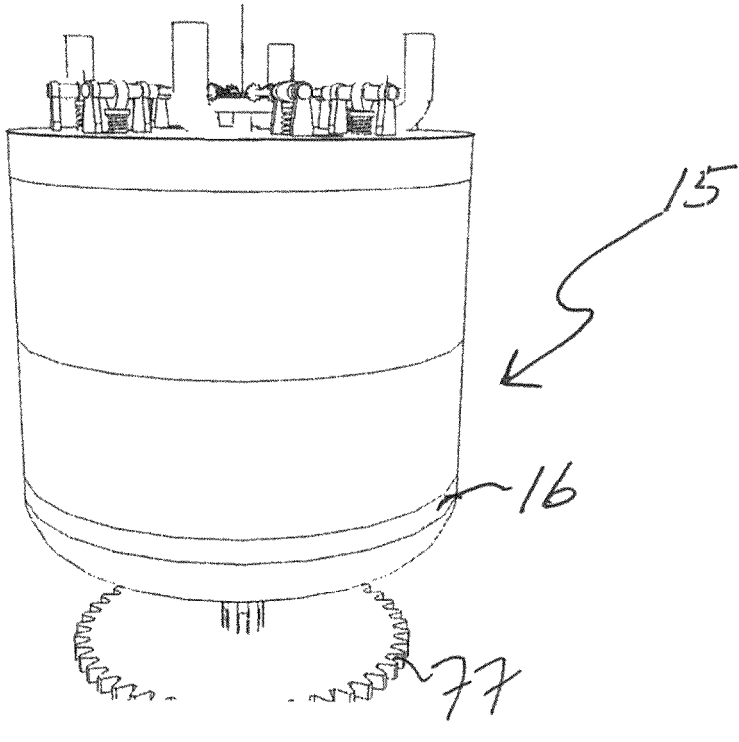
FIG. 12C is a side perspective view of a fully enclosed engine block for any version of the assembly, in accordance with one embodiment.

FIG. 12A shows a substantially cylindrical engine block 15 having an outer casting 12. The engine block 15 shown in FIG. 12A is a partially open engine block that exposes a portion of the length of the cylinders 20 inside the engine block 15. In some embodiments, the portion of the length of the cylinders 20 that is exposed is one-quarter or one-third or one half or 60% or two-thirds or 70%. In some embodiments, this avoids the need for water cooling and allows the use of air cooling. As shown in FIG. 12B1, this engine block 15 with the assembly 10 inside it may be cooled using air cooling infrastructure 29, such as tubes 29, for example air cooling tubes 29 that are coiled around each of the cylinders 20 to cool the cylinder 20 without water. The tubes 29 may be made of aluminum. FIG. 12B2 is a sectional view of four cylinders 20 having such an air cooling system. FIG. 12C shows an entirely closed engine block 15. Any of the embodiments herein of assembly 10, 10' may employ a full enclosed, partially enclosed or fully open engine block 15.

FIG. 12C shows an entirely closed engine block 15. In this embodiment the engine block 15 is at least partially open thus allowing an observer to see the cylinders 20 arranged in a substantial circle, which is more enjoyable to look at (for example when sitting in a boat).

Figure 3B:
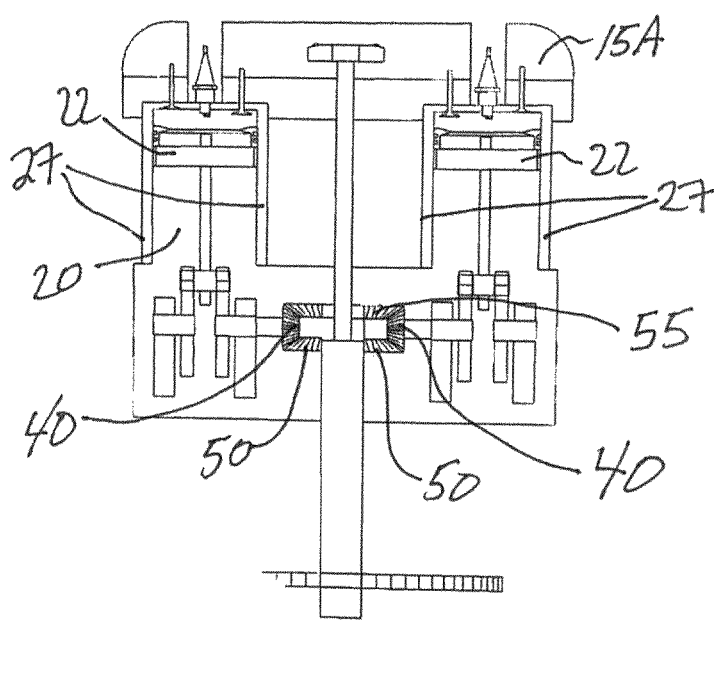
FIG. 3B is a sectional view of four cylinders of an assembly having a water cooling system, in accordance with one embodiment.
Figure 3C:
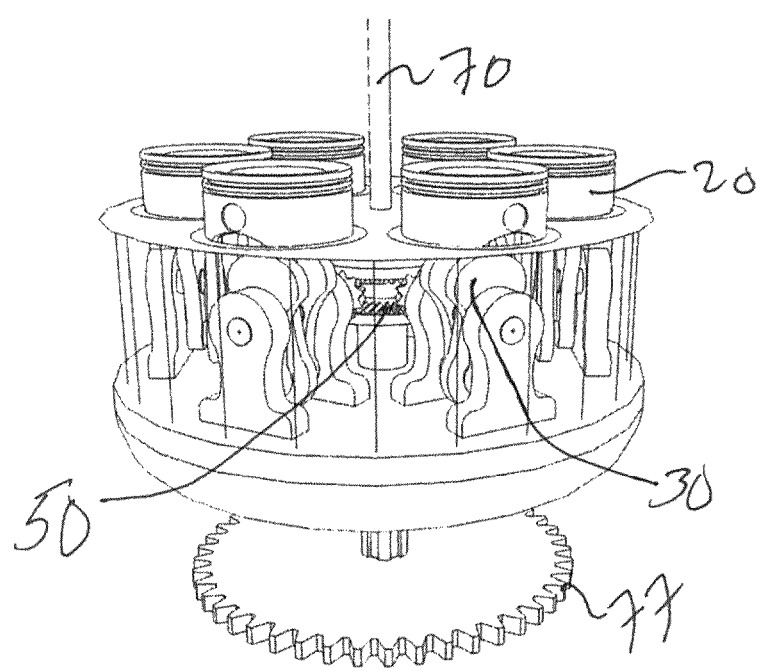
FIG. 3C is a side perspective view of a spatially compact engine block assembly having six cylinders, in accordance with one embodiment.
Figure 4:
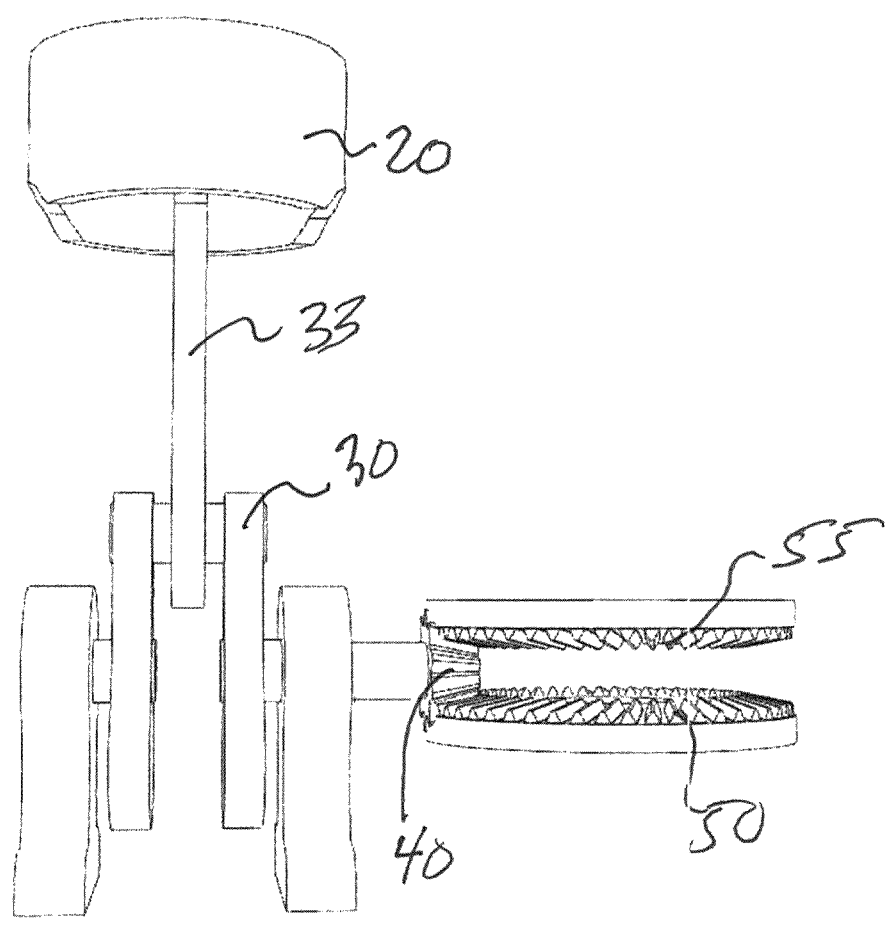
FIG. 4 is a front elevated view of a single piston and connected crankshaft and beveled gear arrangement used in the spatially compact assembly, in accordance with one embodiment.
Figure 5:
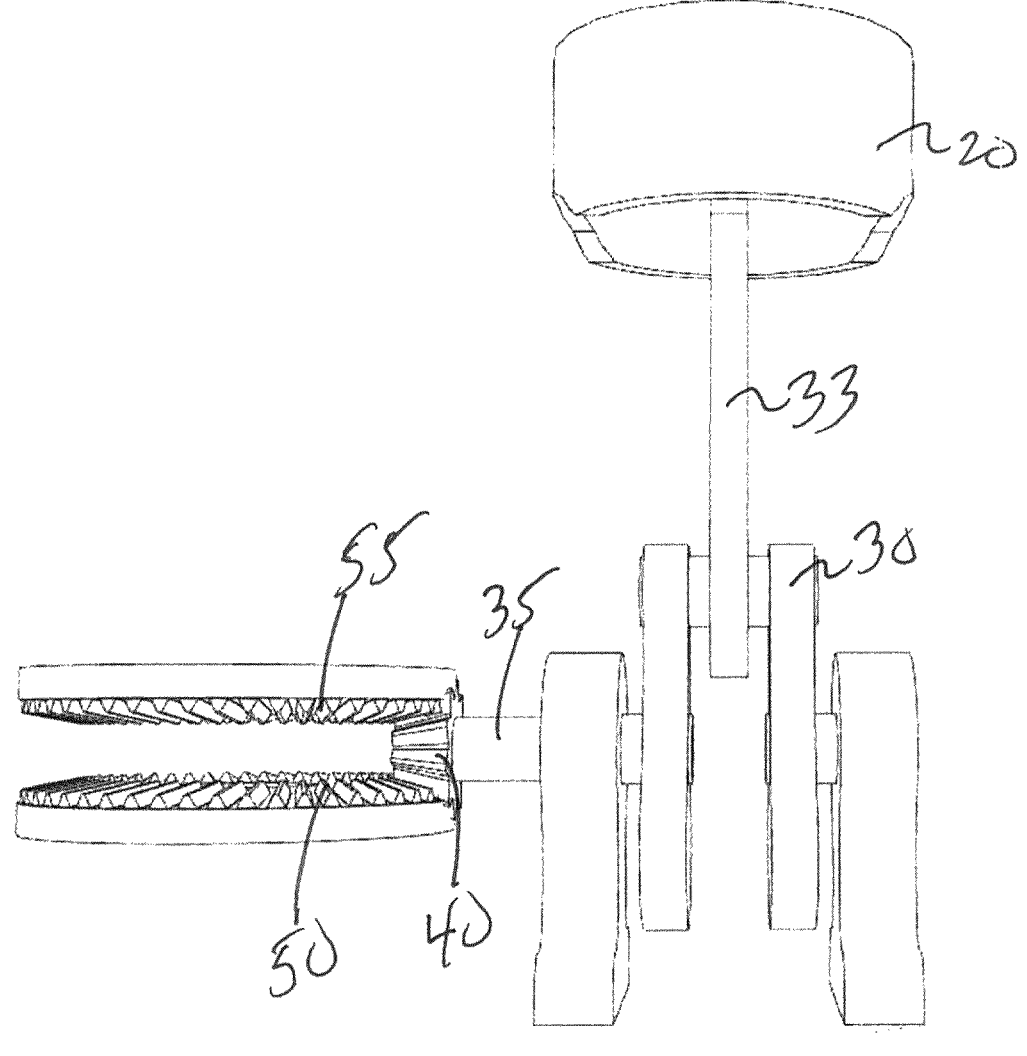
FIG. 5 is a rear view of the piston and connected crankshaft and gears shown in FIG. 4, in accordance with one embodiment.
Figure 6:
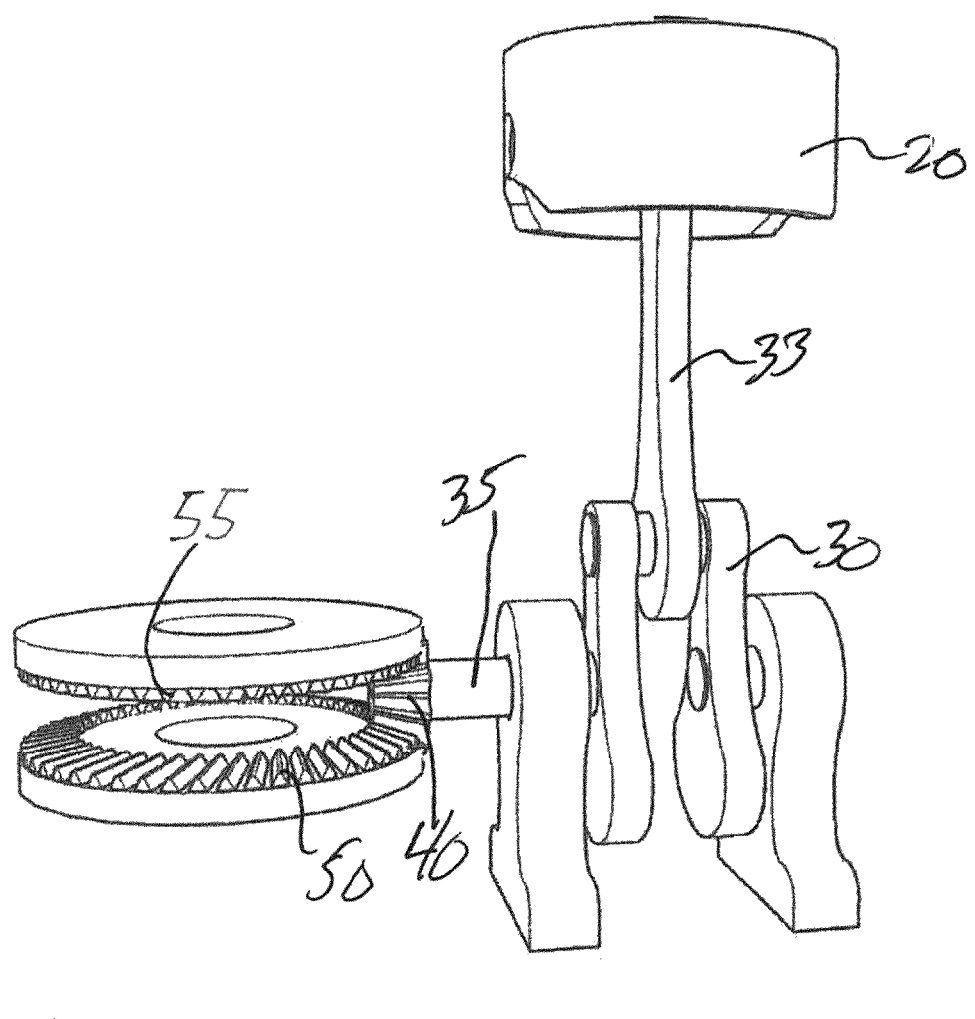
FIG. 6 is a rear perspective view of the piston and connected crankshaft and gears shown in FIG. 4, in accordance with one embodiment.
Figure 7:
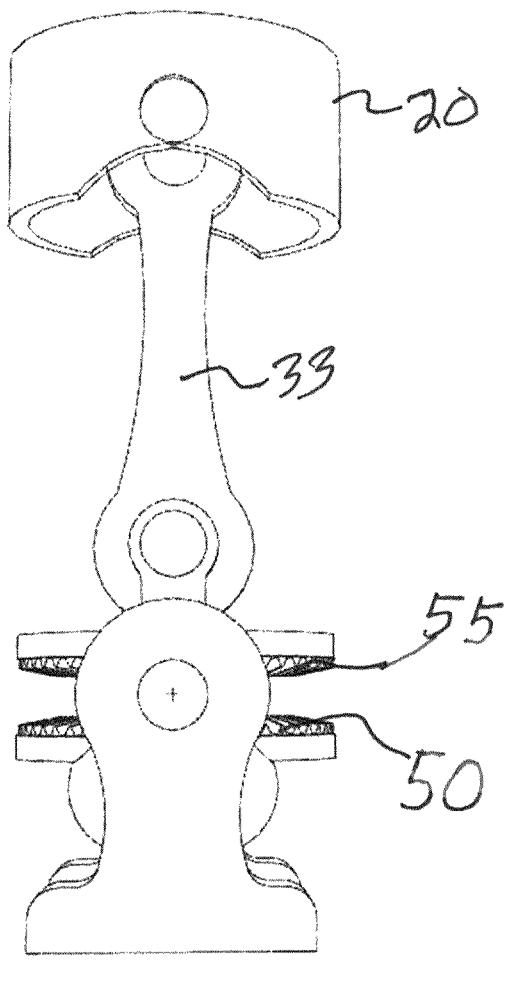
FIG. 7 is a side perspective view of the piston and connected crankshaft and gears shown in FIG. 4 from outside looking toward a center of the assembly looking inward, in accordance with one embodiment.
Figure 8:
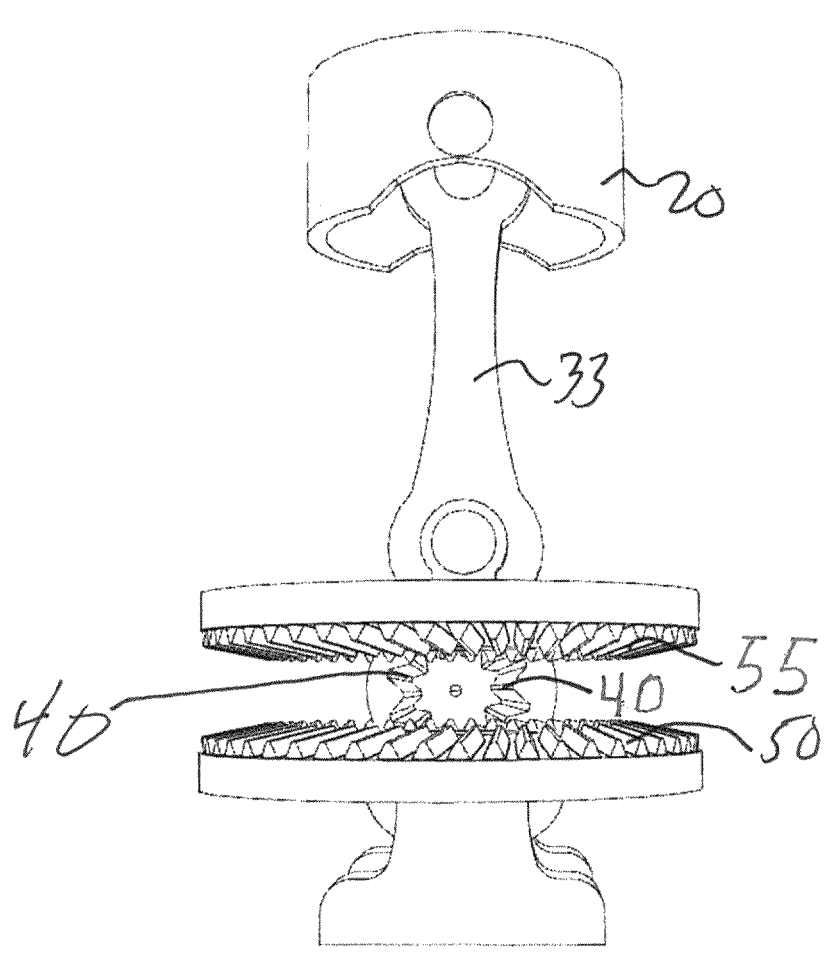
FIG. 8 is a side perspective view of the piston and connected crankshaft and gears shown in FIG. 4 from inside the assembly looking outward, in accordance with one embodiment.

By employing a partially open or fully open (or partially or fully transparent) engine block 15, wherein the cylinders 20 are visible or partly visible and are arranged substantially in a circular formation, a passenger sitting in the back of a boat may have the added enjoyment of looking at an engine block 15 that reminds them of a carousel. Unlike land vehicles, where the engine is not typically visible, in a boat the engine is often visible. This provides an additional advantage of any version of assembly 10 or of assembly 10' in which the engine block 15 is fully open or partially open or transparent, as in FIG. 13A, FIG. 12B1 etc. As explained, this can be implemented not only in air cooled versions but also in water cooled versions. For example, FIG. 3B shows a cross-section of four cylinders 20 with water cooling passages 27 used to cool cylinders 20.

The following are non-limiting examples of diameters of central gear 50 given the number of cylinders 20 in the assembly 10 of the engine block 15:

3 cylinders—the central gear 50 may be about 12 cm in diameter;

6 cylinders—the central gear 50 may be about 18 cm in diameter;

7 cylinders—the central gear 50 may be about 22 cm in diameter;

8 cylinders—the central gear 50 may be about 28 cm in diameter.

The above dimensions are only illustrative and non-limiting—the dimensions may be different in other embodiments.

Figure 14:
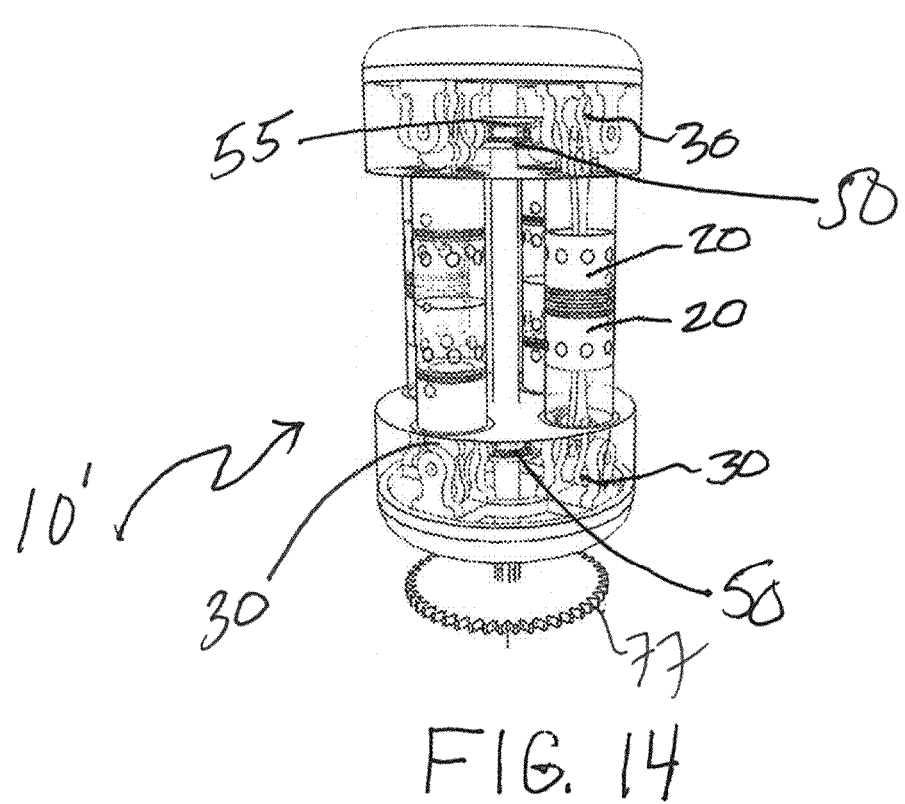
FIG. 14 is a side perspective view of the inside of an engine block using an opposed-piston engine that incorporates an assembly, in accordance with one embodiment.

There are also at least two types of opposed-piston engines (or engine blocks) that the assembly described herein is compatible with. The first type has separate crank-shafts for each cylinder. Each cylinder has a top and a bottom piston. There is no engine head since it has holes on the cylinders for intake and exhaust and injectors without spark plugs. The heated compressed air ignites the mixture. This version is shown in FIG. 14, which is a spatially compact engine block assembly 10' for internal combustion engine in which a set of cylinders 20 holds a top piston and an opposing bottom piston.

The assembly 10' may comprise:

a substantially cylindrical engine block including:

a set of three or more cylinders each having a central vertical axis, the central vertical axes substantially parallel to one another, each of the three or more cylinders has a top piston and a bottom piston that opposes the top piston;

a first set of three or more first crankshafts in an amount equal to an amount of the three or more cylinders, each of the first crankshafts connected to and configured to receive a linear motion generated by a bottom piston in one of the three or more cylinders and to rotate a first shaft, the three or more first crankshafts connected to a bottom end of the engine block;

a first set of three or more first gears in an amount equal to an amount of the three or more first crankshafts and situated in a substantially polygonal relationship to one another, each of the first gears configured to be rotated by the shaft of one of the first crankshafts such that each one of the first crankshafts rotates a different one of the first gears;

a lower central gear situated inward of, and in a beveled relationship with, each of the first gears such that the lower central gear rotates in a direction substantially perpendicular to a rotation of each of the first gears;

a set of three or more second crankshafts in an amount equal to the three or more second cylinders, each of the second crankshafts connected to and configured to receive a linear motion generated by a top piston of one of the three or more cylinders and to rotate a second shaft, the three or more second crankshafts connected to the top pistons at a top end of the engine block;

a set of three or more second gears in an amount equal to the three or more second crankshafts, each of the second gears configured to be rotated by the shaft of one of the second crankshafts such that each one of the second crankshafts rotates a different one of the second gears; and an upper central gear situated inward of, and in a beveled relationship with, each of the second gears such that the upper central gear rotates in a direction substantially perpendicular to a rotation of each of the second gears.

In some implementations, each of the three or more cylinders is positioned such that a collection of coplanar points comprising a point of each of the central vertical axes along a plane substantially perpendicular to the central vertical axes, is substantially a regular polygon. In some embodiments, the number of sides of the substantially regular polygon equals the number of cylinders 20. In some embodiments, the number of sides of the substantially regular polygon equals the number of central vertical axes 25. This correspondence (between the number of cylinders and the number of sides of the substantially regular polygons) is applicable not just to versions of FIG. 14 that have three, four or five cylinders 20 (and whose vertical axes have points that form three, four or five-sided substantially regular polygons), but also versions with more than five cylinders 20, such as six, seven, eight, nine, 10, eleven, twelve, etc.

Figure 15:
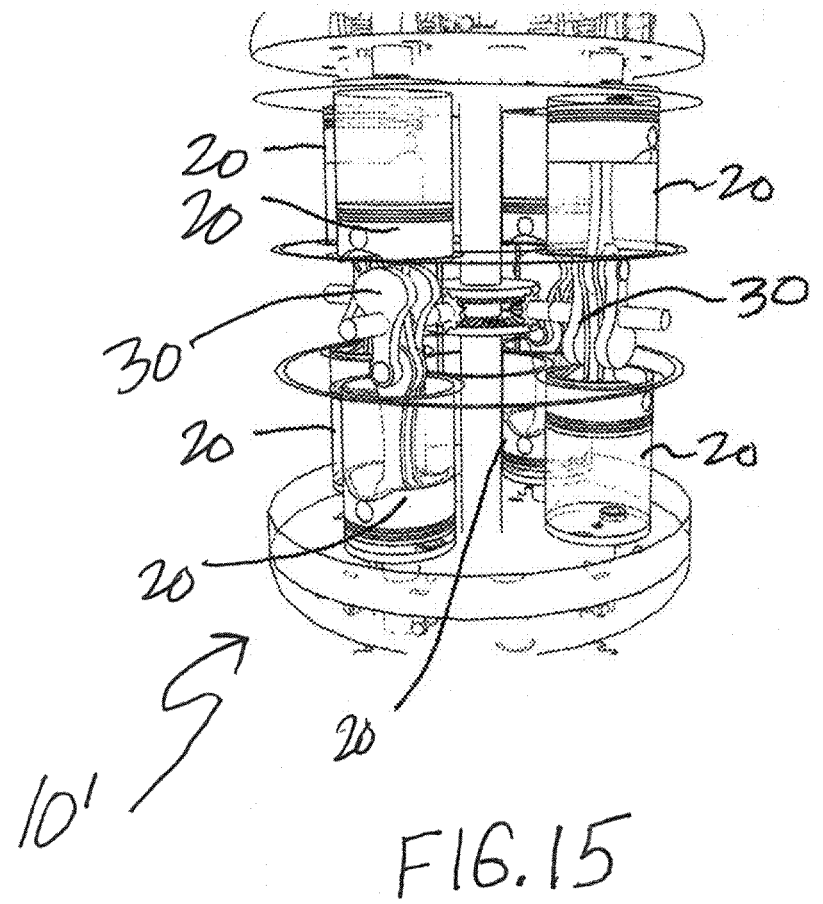
FIG. 15 is a side perspective view of the inside of an engine block using two opposed-piston sets of cylinders and having a single crankshaft between each set of opposed-piston sets of cylinders, in accordance with one embodiment.

The second type of opposed-piston engine that incorporates the assembly herein utilizes a single set of crankshafts that may be in the middle of the engine block and that operates two sets of cylinders one above and one below it. This is shown in FIG. 15, which depicts a spatially compact engine block assembly 10' for internal combustion engine in which two sets of cylinders 20 are arranged in opposing formation. In contrast to the embodiment shown in FIG. 14, in the embodiment shown in FIG. 15 a single vertically symmetrical crankshaft is used between each pair of two opposing cylinders 20. Each pair of opposing cylinders 20 shares the single crankshaft 30. In this embodiment there are two sets of three or more cylinders so the total number of cylinders is doubled.

As seen from FIG. 15, one further embodiment of a spatially compact engine block assembly 10' for an internal combustion engine (of the opposed-piston type), comprises:

a substantially cylindrical engine block including:

a first set of three or more first cylinders each having a first central vertical axis, the first central vertical axes substantially parallel to one another;

a set of three or more crankshafts in an amount equal to an amount of the three or more first cylinders, each of the crankshafts connected to and configured to receive a linear motion generated by one of the three or more first cylinders vis a first connecting rod and to rotate a first shaft, the three or more crankshafts connected to a top end of the first set of three or more first cylinders;

a set of three or more first gears in an amount equal to an amount of the three or more first crankshafts and situated in a substantially polygonal relationship to one another, each of the first gears configured to be rotated by the shaft of one of the crankshafts such that each one of the crankshafts rotates a different one of the first gears;

a central gear situated inward of, and in a beveled relationship with, each of the first gears such that the central gear rotates in a direction substantially perpendicular to a rotation of each of the first gears;

a second set of three or more second cylinders above the first set of three or more first cylinders, each of the three or more second cylinders having a second central vertical axis, the second central vertical axes are substantially parallel to one another, wherein the set of three or more crankshafts are also connected to a bottom end of the second set of three or more second cylinders and are configured to receive a linear motion generated by one of the three or more second cylinders vis a second connecting rod and to rotate the shaft, wherein the three or more crankshafts are connected to a bottom end of the second set of three or more second cylinders.

There is no second central gear. In addition, the central gear of the embodiment of FIG. 15 is likely to be significantly smaller than the central gear in the embodiment of FIG. 14.

For the embodiment of FIG. 15, in some implementations, each of the at least three first cylinders (or second cylinders) is positioned such that a collection of coplanar points comprising a point of each of the first (or second) central vertical axes along a plane substantially perpendicular to the first (or second) central vertical axes, is substantially a regular polygon. In some embodiments, the number of sides of the substantially regular polygon equals the number of cylinders 20 of the first set (or of the second set) of cylinders 20. In some embodiments, the number of sides of the substantially regular polygon equals the number of first (or second) central vertical axes 25. This correspondence (between the number of cylinders in a set and the number of sides of the substantially regular polygons) is applicable not just to versions of FIG. 15 that have three, four or five cylinders 20 in the first or second set of cylinders (and whose vertical axes have points that form three, four or five-sided substantially regular polygons), but also versions with more than five cylinders 20, such as six, seven, eight, nine, 10, eleven, twelve, etc. in the first or second sets of cylinders.

The assembly 10' of FIG. 15 may also work with (or include) two engine heads, one for each set of cylinders.

In some implementations, each of the at least three cylinders is positioned such that a collection of coplanar points comprising a point of each of the first central vertical axes along a plane substantially perpendicular to the first central vertical axes, is substantially a regular polygon.

Regarding the opposed-piston embodiments of FIG. 14 and FIG. 15, In some implementations, the number of sides of the substantially regular polygon equals the number of cylinders 20. In some embodiments, as seen from FIGS. 9-11, the number of sides of the substantially regular polygon equals the number of central vertical axes 25. Although the non-limiting implementations of FIGS. 9-11 have three, four or five cylinders 20 and three, four and five-sided substantially regular polygons, the same can be done with more than five cylinders 20, such as six, seven, eight, nine, 10, eleven, twelve, etc.

Although the invention has been explained in relation to its preferred embodiment, it is to be understood that many other possible modifications and variations can be made without departing from the spirit and scope of the invention.

What is claimed is:

1. A spatially compact engine block assembly for an internal combustion engine, comprising:

a substantially cylindrical engine block including:

three or more cylinders, each having a central vertical axis, the central vertical axes are substantially parallel to one another;

three or more crankshafts in an amount equal to an amount of the three or more cylinders, each of the crankshafts connected to and configured to receive a linear motion generated by one of the three or more cylinders and to rotate a shaft, the three or more crankshafts connected to a bottom end of the engine block;

three or more first gears in an amount equal to an amount of the three or more crankshafts, each of the first gears configured to be rotated by the shaft of one of the crankshafts such that each one of the crankshafts rotates a different one of the first gears; and a central gear situated inward of, and in a beveled relationship with, each of the first gears such that the central gear rotates in a direction substantially perpendicular to a rotation of each of the first gears.

2. The spatially compact engine block assembly of claim 1, wherein each of the three or more cylinders is positioned such that a collection of coplanar points comprising a point of each of the central vertical axes along a plane substantially perpendicular to the central vertical axes, is substantially a regular polygon.

3. The spatially compact engine block assembly of claim 1, wherein the central gear rotates substantially within a plane and wherein a length of the cylinders is substantially perpendicular to the plane.

4. The spatially compact engine block assembly of claim 1, further comprising a second central gear parallel to the central gear, the second central gear situated inward of and in a beveled relationship with each of the first gears such that the second central gear rotates in a direction substantially perpendicular to the rotation of each of the first gears.

5. The spatially compact engine block assembly of claim 4, wherein the second central gear is distanced from the central gear by approximately a height of the first gears.

6. The spatially compact engine block assembly of claim 1, wherein each of the three or more first gears is situated equidistant from an underside of the engine block.

7. The spatially compact engine block assembly of claim 1, wherein the three or more cylinders comprise four cylinders or five cylinders or six cylinders.

8. The spatially compact engine block assembly of claim 1, wherein the three or more cylinders comprise seven cylinders.

9. The spatially compact engine block assembly of claim 1, wherein the three or more cylinders comprise at least eight cylinders.

10. The spatially compact engine block assembly of claim 1, wherein each of the cylinders comprises a piston and wherein for each of the three or more crankshafts a line of translation of a particular piston of a particular cylinder is substantially parallel to an axle of rotation of a particular crankshaft connected to the particular cylinder.

11. A spatially compact engine block assembly for an internal combustion engine, comprising:

a substantially cylindrical engine block including:

a first set of three or more cylinders each having a central vertical axis, the central vertical axes substantially parallel to one another, each of the three or more cylinders has a top piston and a bottom piston that opposes the top piston;

a first set of three or more first crankshafts in an amount equal to an amount of the three or more cylinders, each of the first crankshafts connected to and configured to receive a linear motion generated by a bottom piston of one of the three or more cylinders and to rotate a first shaft, the three or more first crankshafts connected to a top end of the engine block;

a first set of three or more first gears in an amount equal to an amount of the three or more first crankshafts and situated in a substantially polygonal relationship to one another, each of the first gears configured to be rotated by the shaft of one of the first crankshafts such that each one of the first crankshafts rotates a different one of the first gears;

a lower central gear situated inward of, and in a beveled relationship with, each of the first gears such that the lower central gear rotates in a direction substantially perpendicular to a rotation of each of the first gears;

a set of three or more second crankshafts in an amount equal to the three or more cylinders, each of the second crankshafts connected to and configured to receive a linear motion generated by a top piston of one of the three or more second cylinders and to rotate a second shaft, the three or more second crankshafts connected to a top end of the engine block;

a set of three or more second gears in an amount equal to the three or more second crankshafts, each of the second gears configured to be rotated by the shaft of one of the second crankshafts such that each one of the second crankshafts rotates a different one of the second gears; and an upper central gear situated inward of, and in a beveled relationship with, each of the second gears such that the upper central gear rotates in a direction substantially perpendicular to a rotation of each of the second gears.

12. The spatially compact engine block assembly of claim 11, wherein each of the three or more cylinders is positioned such that a collection of coplanar points comprising a point of each of the central vertical axes along a plane substantially perpendicular to the central vertical axes, is substantially a regular polygon.

13. The spatially compact engine block assembly of claim 11, wherein the lower central gear rotates substantially within a plane and wherein a length of each of the three or more cylinders is substantially perpendicular to the plane and wherein the upper central gear rotates substantially within a second plane and wherein the first plane is substantially perpendicular to the second plane.

14. The spatially compact engine block assembly of claim 11, further comprising a second lower central gear parallel to the lower central gear, the second lower central gear situated inward of and in a beveled relationship with each of the first gears such that the second lower central gear rotates in a direction substantially perpendicular to the rotation of each of the first gears.

15. The spatially compact engine block assembly of claim 14, wherein the second lower central gear is distanced from the lower central gear by approximately a height of the first gears.

16. The spatially compact engine block assembly of claim 11, further comprising a second upper central gear parallel to the upper central gear, the second upper central gear situated inward of and in a beveled relationship with each of the second gears such that the second upper central gear rotates in a direction substantially perpendicular to the rotation of each of the second gears.

17. The spatially compact engine block assembly of claim 16, wherein the second upper central gear is distanced from the upper central gear by approximately a height of the second gears.

18. The spatially compact engine block assembly of claim 11, wherein the three or more cylinders comprise four cylinders or five cylinders or six cylinders.

19. The spatially compact engine block assembly of claim 11, wherein the three or more cylinders comprise seven cylinders.

20. The spatially compact engine block assembly of claim 11, wherein each of the three or more cylinders comprises a piston and wherein for each of the three or more first crankshafts a line of translation of a particular piston of a particular cylinder of the three or more cylinders is substantially parallel to an axle of rotation of a particular first crankshaft connected to the particular cylinder.

21. A spatially compact engine block assembly for an internal combustion engine, comprising:

a substantially cylindrical engine block including:

a first set of three or more first cylinders each having a first central vertical axis, the first central vertical axes substantially parallel to one another;

a set of three or more crankshafts in an amount equal to an amount of the three or more first cylinders, each of the crankshafts connected to and configured to receive a linear motion generated by one of the three or more first cylinders vis a first connecting rod and to rotate a first shaft, the three or more crankshafts connected to a top end of the first set of three or more first cylinders;

a set of three or more first gears in an amount equal to an amount of the three or more first crankshafts and situated in a substantially polygonal relationship to one another, each of the first gears configured to be rotated by the shaft of one of the crankshafts such that each one of the crankshafts rotates a different one of the first gears;

a central gear situated inward of, and in a beveled relationship with, each of the first gears such that the central gear rotates in a direction substantially perpendicular to a rotation of each of the first gears;

a second set of three or more second cylinders above the first set of three or more first cylinders, each of the three or more second cylinders having a second central vertical axis, the second central vertical axes are substantially parallel to one another, wherein the set of three or more crankshafts are also connected to a bottom end of the second set of three or more second cylinders and are configured to receive a linear motion generated by one of the three or more second cylinders vis a second connecting rod and to rotate the shaft, wherein the three or more crankshafts are connected to a bottom end of the second set of three or more second cylinders.

22. The spatially compact engine block assembly of claim 21, wherein each of the three or more first cylinders is positioned such that a collection of coplanar points comprising a point of each of the first central vertical axes along a plane substantially perpendicular to the first central vertical axes, is substantially a regular polygon.

* * * * *